United States Patent
Takimoto

(10) Patent No.: US 10,373,465 B2
(45) Date of Patent: Aug. 6, 2019

(54) INFORMATION PROCESSING DEVICE AND INFORMATION PROCESSING METHOD

(71) Applicant: SONY CORPORATION, Tokyo (JP)

(72) Inventor: Yuuji Takimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 15/529,566

(22) PCT Filed: Nov. 25, 2015

(86) PCT No.: PCT/JP2015/082980
§ 371 (c)(1),
(2) Date: May 25, 2017

(87) PCT Pub. No.: WO2016/088611
PCT Pub. Date: Jun. 9, 2016

(65) Prior Publication Data
US 2017/0316669 A1    Nov. 2, 2017

(30) Foreign Application Priority Data

Dec. 2, 2014 (JP) .................................. 2014-244131

(51) Int. Cl.
| G08B 21/02 | (2006.01) |
| H04M 11/00 | (2006.01) |
| G06K 9/62 | (2006.01) |
| H04N 7/18 | (2006.01) |
| G08B 25/10 | (2006.01) |

(52) U.S. Cl.
CPC ....... *G08B 21/0269* (2013.01); *G06K 9/6202* (2013.01); *G08B 21/028* (2013.01); *G08B 21/0208* (2013.01); *H04M 11/00* (2013.01); *H04N 7/185* (2013.01); *G08B 25/10* (2013.01)

(58) Field of Classification Search
CPC ............ G08B 21/0269; G08B 21/0208; G08B 21/028; G06K 9/6202; H04M 11/00; H04N 7/185
See application file for complete search history.

(56) References Cited

U.S. PATENT DOCUMENTS

2003/0215010 A1* 11/2003 Kashiwa .......... G08B 13/19621
375/240.02

FOREIGN PATENT DOCUMENTS

| JP | 2003-274360 A | 9/2003 |
| JP | 2007-074071 A | 3/2007 |
| JP | 2009-077064 A | 4/2009 |

OTHER PUBLICATIONS

International Search Report and Written Opinion of PCT Application No. PCT/JP2015/082980, dated Feb. 23, 2016, 01 pages of English Translation and 06 pages of ISRWO.

* cited by examiner

*Primary Examiner* — Curtis B Odom
(74) *Attorney, Agent, or Firm* — Chip Law Group

(57) ABSTRACT

Object: To propose an information processing device capable of properly notifying a current state of a wearer on the basis of a result of determining whether or not the wearer is safe. Solution: Provided is the information processing device including: a determination result acquisition unit configured to acquire a determination result of a safety state of a user carrying a sensing unit for sensing a peripheral environment; and a frequency determination unit configured to determine a processing frequency for recording information based on the sensing, on a basis of the determination result acquired by the determination result acquisition unit.

20 Claims, 8 Drawing Sheets

FIG. 7
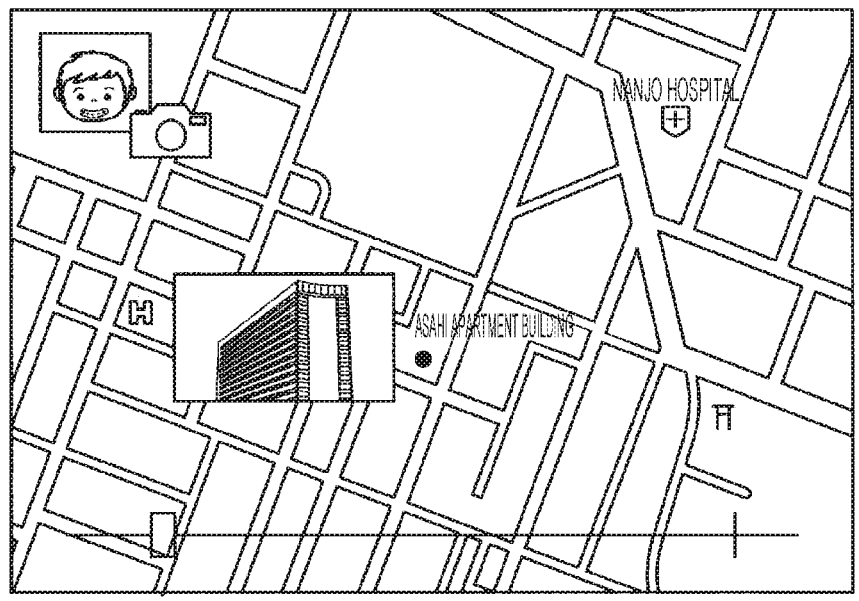
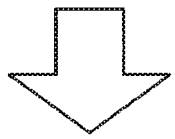
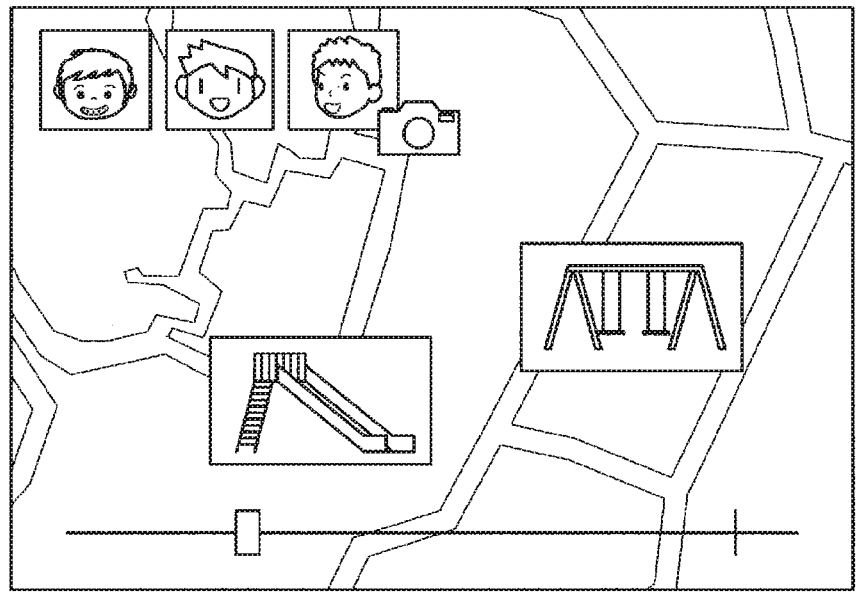

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/082980 filed on Nov. 25, 2015, which claims priority benefit of Japanese Patent Application No. JP 2014-244131 filed in the Japan Patent Office on Dec. 2, 2014. Each of the above-referenced applications is hereby incorporated herein by reference in its entirety.

TECHNICAL FIELD

The present disclosure relates to an information processing device, an information processing method, and a computer program.

BACKGROUND ART

Services using positional information are widespread. For example, a service is provided in which a parent makes a child carry a device with a positioning function, and thereby monitoring a current position of the child (refer to, e.g., Patent Literature 1).

CITATION LIST

Patent Literature

Patent Literature 1: JP 2009-246806A

DISCLOSURE OF INVENTION

Technical Problem

However, with existing services, positional information of a device carried by the child is only acquired. It is possible for the parent to grasp a current position of the child, but not possible to grasp a current state of the child.

A method is considered in which a child carries a wearable device with a camera for capturing a life-log image, and an image captured by the wearable device is transmitted to a terminal of a parent. However, if images are captured and transmitted periodically, the parent cannot judge which image is important when checking the images with the terminal, and the consumption of a battery of the wearable device will increase.

Accordingly, this disclosure proposes a novel and improved information processing device, information processing method, and computer program capable of properly notifying a current state of a wearer on the basis of a result of determining whether or not the wearer is safe.

Solution to Problem

According to the present disclosure, there is provided an information processing device including: a determination result acquisition unit configured to acquire a determination result of a safety state of a user carrying a sensing unit for sensing a peripheral environment; and a frequency determination unit configured to determine a processing frequency for recording information based on the sensing, on a basis of the determination result acquired by the determination result acquisition unit.

In addition, according to the present disclosure, there is provided an information processing method including: acquiring a determination result of a safety state of a user carrying a sensing unit for sensing a peripheral environment; and determining a processing frequency for recording information based on the sensing, on a basis of the acquired determination result.

In addition, according to the present disclosure, there is provided a computer program for causing a computer to execute: acquiring a determination result of a safety state of a user carrying a sensing unit for sensing a peripheral environment; and determining a processing frequency for recording information based on the sensing, on a basis of the acquired determination result.

Advantageous Effects of Invention

As described above, according to the present disclosure, it is possible to provide a novel and improved information processing device, information processing method, and computer program capable of properly notifying a current state of a wearer on the basis of a result of determining whether or not the wearer is safe.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an explanatory diagram showing another example of the user interface displayed on the display unit 210 of the mobile terminal 200.

MODE(S) FOR CARRYING OUT THE INVENTION

Figure 1:
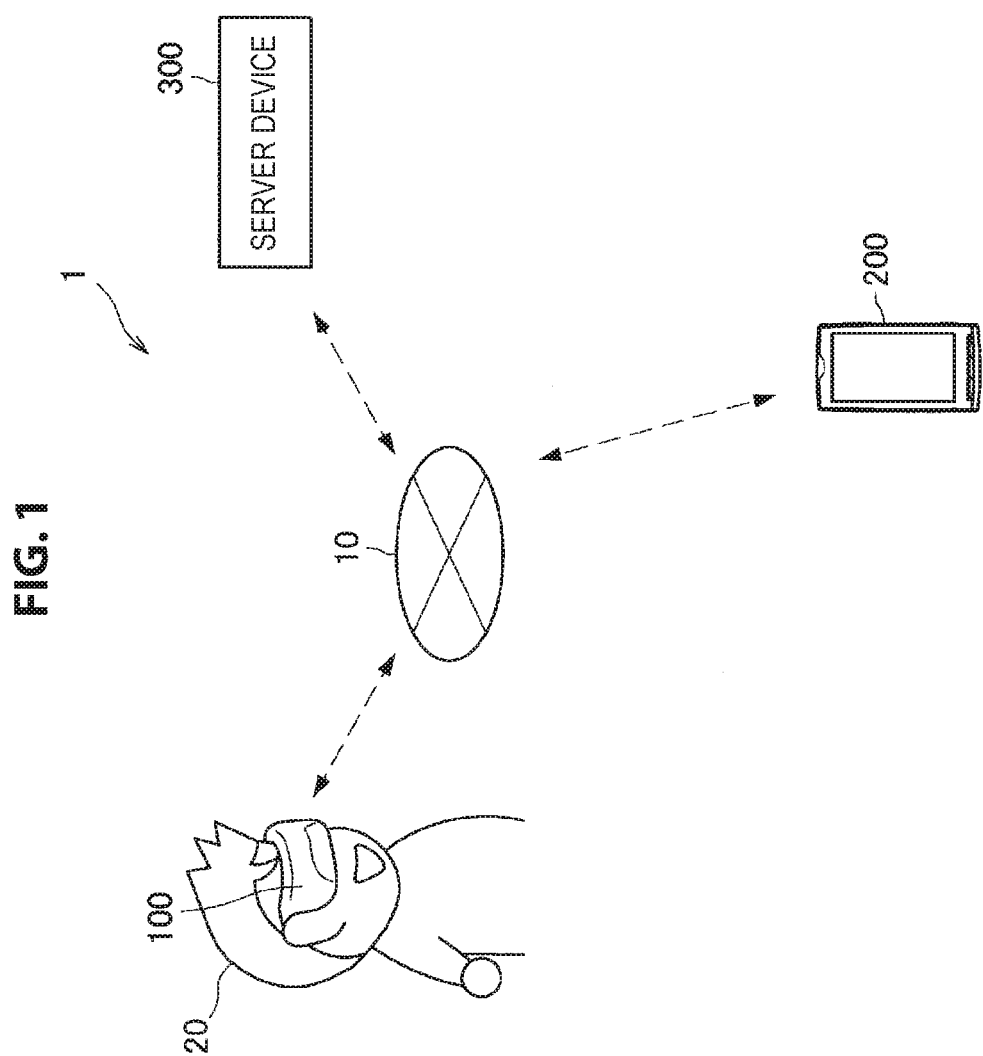
FIG. 1 is an explanatory diagram showing a configuration example of an information processing system 1 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, a description will be given in the following order.
1. An embodiment of the Present Disclosure
    1.1. Background
    1.2. Configuration Example
    1.3. Operational Example
2. Hardware Configuration Example
3. Conclusion

1. An Embodiment of the Present Disclosure

1.1. Background

A description will be given of a background of the disclosure before specifically explaining an embodiment of the present disclosure.

As described above, services using positional information are wide spread. For example, a service is provided in which a parent makes a child carry a device with a positioning function, and thereby monitoring a current position of the child.

However, with existing services, positional information of a device carried by the child is only acquired. It is possible for the parent to grasp a current position of the child, but not possible to grasp a current state of the child.

In recent years, a wearable device with a camera for capturing a life-log image has been manufactured. A method is considered in which a child carries the wearable device, an image captured by the wearable device is transmitted to a terminal of a parent, and thereby the parent grasps a state of the child.

However, when the wearable device captures images and transmits them periodically, the parent cannot judge which image is important when checking the images with the terminal. In addition, if the wearable device captures images and transmits them periodically, it is conceivable that consumption of a battery of the wearable device will increase, and as a result, it is not possible to capture an image of an important scene due to battery exhaustion.

Accordingly, a person of the present disclosure examines a technology that can properly inform a current state of a wearer to another device. As a result, the person of the present disclosure can devise a technology for properly notifying another device of the current state of the wearer on the basis of a result of determining whether or not the wearer is safe.

The background of the embodiment of the present disclosure has been described above. Subsequently, a description will be given of the embodiment of the present disclosure.

1.2. Configuration Example

First, a description will be given of a configuration example of an information processing system according to an embodiment of the present disclosure. FIG. 1 is an explanatory diagram showing a configuration example of an information processing system 1 according to the embodiment of the present disclosure.

FIG. 1 shows an example of the whole configuration of the information processing system 1 including a wearable device 100 having an imaging device and carried by a user 20, a mobile terminal 200 that receives information from the wearable device 100, and a server device 300 that intervenes between reception and transmission of information between the wearable device 100 and the mobile terminal 200. The wearable device 100 can be attached to the head, breast, or the like of the user 20 so as to capture an image of a situation around the user 20. Further, the wearable device 100 may be attached to an object possessed by the user 20, such as a hat, a school bag, or a bag. That is, according to the present embodiment, 'carry' can mean both a case of directly attaching the wearable device 100 to the body of the user 20 and a case of indirectly attaching the wearable device 100 to the body of the user 20.

An outline of the information processing system 1 will be described. The wearable device 100 having the imaging device, carried by the user 20 (in particular, a child) allows the imaging device to image the image in a case of satisfying a predetermined condition. The wearable device 100 transmits information based on the captured image to the server device 300 via a network 10, such as the Internet. The server device 300 transmits the information transmitted from the wearable device 100 to the mobile terminal 200.

The information processing system 1 according to the embodiment of the present disclosure has the configuration shown in FIG. 1, thereby transmitting not only a position of the user 20 who carries the wearable device 100 but also information including a periphery situation to the mobile terminal 200. Therefore, a user (e.g., parent of a child who carries the wearable device 100) of the mobile terminal 200 views information transmitted from the wearable device 100 with the mobile terminal 200, thereby grasping a current position and a current state of the user 20.

According to the present embodiment, the wearable device 100 determines, as the predetermined condition, whether or not an index indicating whether or not the user 20 is in a safe state exceeds a predetermined threshold, and determines a processing frequency for recording the information on the basis of the determination result. According to the present embodiment, the wearable device 100 causes the imaging device to capture an image as a processing frequency for recording the information, and determines the imaging frequency for recording an imaging result. Further, according to the present embodiment, the wearable device 100 transmits information including an image acquired as a result of the imaging processing of the imaging device as the processing frequency for recording the information to the mobile terminal 200 via the server device 300, and determines a notification frequency for allowing the mobile terminal 200 to record the information.

Although the details will be described later, the index indicating whether or not the user 20 is in the safe state is determined depending on whether or not the user 20 is at a safe place (e.g., school), or continuously stays at the same place, for example. The wearable device 100 determines the index indicating whether or not the user 20 is in the safe state with information acquired on the basis of the current location and the current time of the wearable device 100.

In the following, the index indicating whether the user 20 is in the safe state is also called a 'safety level'.

According to the present embodiment, the determination of the processing frequency for recording the information includes both switching between non-processing and processing and determination of an interval or a number of times of the processing in a processing state. In a case where the wearable device 100 causes the imaging device to capture an image as a processing frequency for recording the information and determines an imaging frequency for recording an imaging result, it is assumed that the case includes both of switching on/off of an imaging processing function with the imaging device and determination of the interval or the number of times of the imaging processing in a state where the imaging processing function is turned on.

In a case where the wearable device 100 determines the notification frequency as a processing frequency for recording the information, it is assumed that the case includes both of switching on/off of the notification function and determination of the interval or the number of times of the imaging processing in a state where the notification function is turned on.

It is assumed that the 'imaging processing' includes photoelectrically converting processing with an imager included in the imaging device or recording processing of the photoelectrically converted image to a memory or a local recording medium.

In the above description, it has been described that the wearable device 100 includes the imaging device. However, the present disclosure is not limited to the example. The wearable device 100 may be configured as a device different from the imaging device, that is, the imaging device and the device with a function for determining the aforementioned processing frequency may be configured as separate devices.

The server device 300 may be configured to not only intervene transmission and reception of information between the wearable device 100 and the mobile terminal 200 but also perform analysis processing or the like on the image that the wearable device 100 has caused the imaging device to capture.

The description has been given above of the configuration example of the information processing system 1 according to the embodiment of the present disclosure by use of FIG. 1. Subsequently, a description will be given of a specific functional configuration example of the information processing system 1 according to the embodiment of the present disclosure.

Figure 2:
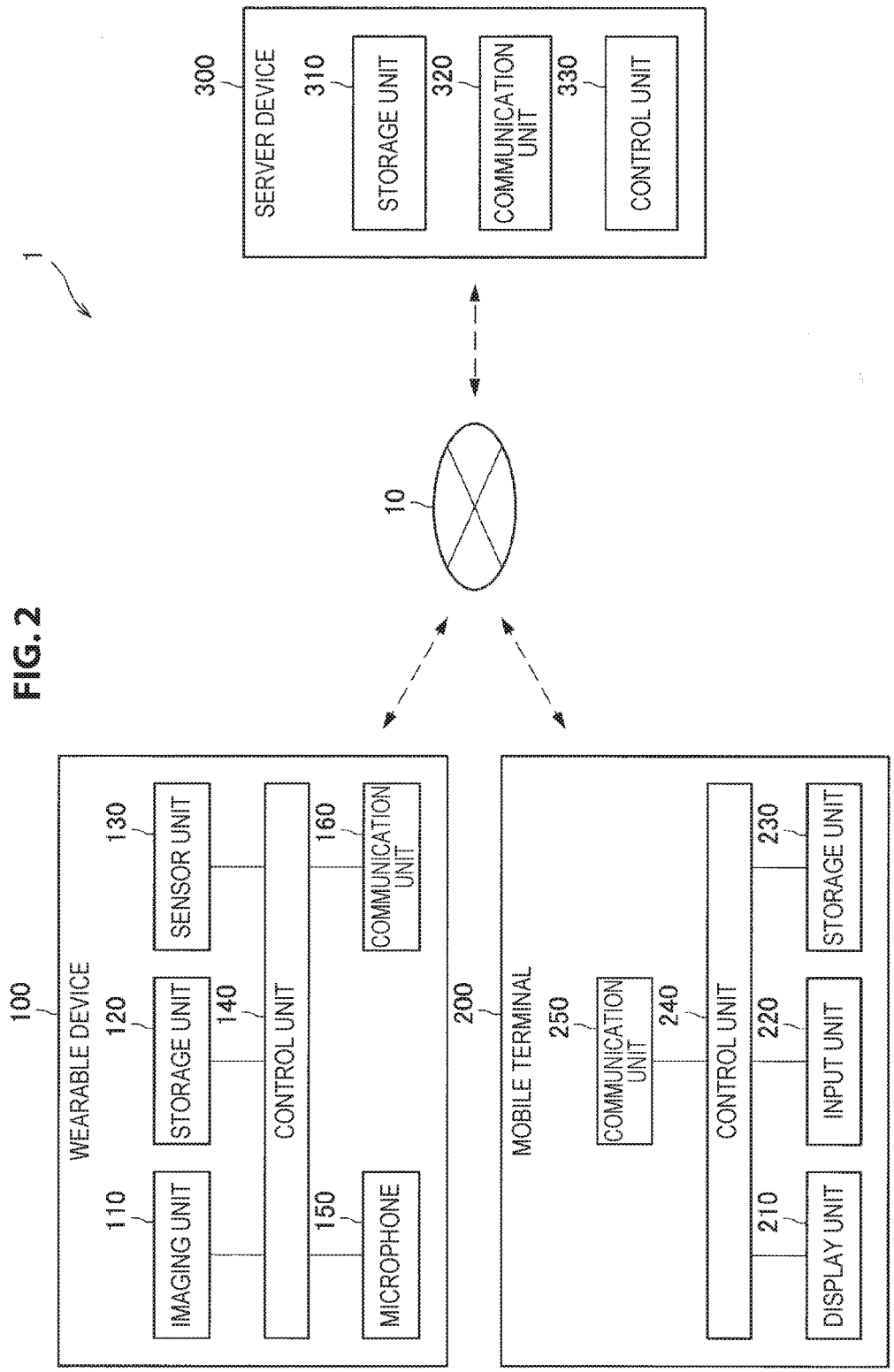
FIG. 2 is an explanatory diagram showing a specific functional configuration example of devices forming the information processing system 1 according to an embodiment of the present disclosure.

FIG. 2 is an explanatory diagram showing a specific functional configuration example of devices forming the information processing system 1 according to the embodiment of the present disclosure. Hereinbelow, a description will be given of a specific functional configuration example of the devices forming the information processing system 1 according to the embodiment of the present disclosure by use of FIG. 2.

As shown in FIG. 2, the wearable device 100 according to the embodiment of the present disclosure includes an imaging unit 110, a storage unit 120, a sensor unit 130, a control unit 140, a microphone 150, and a communication unit 160.

The imaging unit 110 includes a lens, an image sensor, and the like, and captures an image on the basis of an instruction from the control unit 140. The imaging unit 110 captures a still image or a moving image. The image acquired by the imaging processing in the imaging unit 110 is stored into the storage unit 120 according to necessity and is subjected to image processing by the control unit 140. The image acquired by the imaging processing in the imaging unit 110 can be transmitted to the server device 300 by the communication unit 160.

The storage unit 120 can have various storage media such as a read only memory (ROM) and a random access memory (RAM). The storage unit 120 stores a program or various information for operations of the wearable device 100. The information stored in the wearable device 100 can include, e.g., the image captured by the imaging unit 110 and sensing data output by the sensor unit 130, which will be described later. The program and various information stored in the storage unit 120 are occasionally read by the control unit 140.

The storage unit 120 in the wearable device 100 may store map information. The map information is stored in the storage unit 120 and the control unit 140, which will be described later, can determine the safety level of the user 20 while checking the map information.

The sensor unit 130 outputs the sensing data to the control unit 140. A sensing device forming the sensor unit 130 can include a sensor that acquires the current position such as a global positioning system (GPS), a global navigation satellite system (GLONASS), and a beidou navigation satellite system (BDS), a camera, a camera with depth information, a human detection sensor, a microphone, and the like. Therefore, the imaging unit 110 may be included as a part of the sensor unit 130.

Such sensing devices detect acceleration and angular speed applied to the device, direction, illuminance, temperature, atmospheric pressure, and the like. The above various sensing devices, for example, in a case where an apparatus including the sensing devices is carried by or attached to a user, can detect various information as information about the user, e.g., information indicating movement or direction of the user. The sensing devices may also include a sensor that detects biological information of the user, such as heart beats, sweat, brain waves, a sense of touching, a sense of smelling, and a sense of tasting.

The control unit 140 includes, e.g., a central processing unit (CPU), a ROM, and a RAM, and controls operations of the wearable device 100. The control unit 140 may read and sequentially execute computer programs stored in the storage unit 120, thereby controlling operations of the wearable device 100.

In the present embodiment, the control unit 140 determines whether or not the index (safety level) indicating whether or not the user 20 is in the safe state exceeds a predetermined threshold, and determines the processing frequency for recording the information on the basis of the determination result. In the present embodiment, the control unit 140 causes the imaging device to capture an image as the processing frequency for recording the information and determines the imaging frequency for recording an imaging result. Further, in the present embodiment, the control unit 140 transmits information including the image acquired as a result of the imaging processing of the imaging device as the processing frequency for recording the information to the mobile terminal 200 via the server device 300, and determines the notification frequency for allowing the mobile terminal 200 to record the information.

The microphone 150 collects periphery sound of the wearable device 100 and generates an audio signal. The audio signal generated by the microphone 150 is stored in the storage unit 120 according to the necessity and is subjected to audio processing by the control unit 140. The audio signal acquired by collecting sound with the microphone 150 can be transmitted to the server device 300 by the communication unit 160.

The communication unit 160 executes communication processing with an external part. Communication processing executed by the communication unit 160 is not limited to a predetermined standard or protocol. In the present embodiment, the communication unit 160 is configured to execute transmission and reception of various information to/from the server device 300 via the network 10.

Note that, although not shown in FIG. 2, the wearable device 100 includes a battery, and is operated by DC electric power supplied by the battery. The battery included in the wearable device 100 may be a chargeable and dischargeable secondary cell or may be a primary cell capable of only discharging DC electric power.

As shown in FIG. 2, the mobile terminal 200 according to the embodiment of the present disclosure includes a display unit 210, an input unit 220, a storage unit 230, a control unit 240, and a communication unit 250.

The display unit 210 includes a display panel, such as a liquid crystal display or an organic EL display, and is a device that displays various information, such as a character and an image. In the present embodiment, the display unit 210 can display an image captured by the wearable device 100 with predetermined GUI, as will be described later. Note that, the display unit 210 may include a touch panel, and may receive an input operation by allowing the user to touch the display unit 210. In this case, the display unit 210 also can function as the input unit 220, which will be described later.

The input unit 220 is various input devices that receive inputs from the user, and may include a keyboard, a mouse, and a touch panel, for example.

Further, various sensing devices also can function as the input unit 220. Such sensing devices can include a sensor that acquires the current position, such as a GPS, GLONASS, and BDS, a camera, a camera with depth information, a human detection sensor, and a microphone, for example.

Such sensing devices detect acceleration and angular speed applied to the device, direction, illuminance, temperature, atmospheric pressure, and the like. The above various sensing devices, for example, in a case where an apparatus including the sensing devices is carried by or attached to a user, can detect various information as information about the user, e.g., information indicating movement or direction of the user. The sensing devices may also include a sensor that detects biological information of the user, such as heart beats, sweat, brain waves, a sense of touching, a sense of smelling, and a sense of tasting.

The storage unit 230 can include various storage media, such as a ROM and a RAM. The storage unit 230 stores a program and various information for operations of the mobile terminal 200. In the present embodiment, the storage unit 230 can store various information acquired by the wearable device 100 and transmitted from the server device 300. The information acquired by the wearable device 100 and transmitted from the server device 300 can include an image captured by the wearable device 100, sound collected by the wearable device 100, information based on sensing data acquired by the wearable device 100, and the like.

The control unit 240 includes, for example, a CPU, a ROM, and a RAM, and controls operations of the mobile terminal 200. The control unit 240 may read and sequentially execute computer programs stored in the storage unit 230, thereby controlling operations of the mobile terminal 200. In the present embodiment, the control unit 240, for example, controls the display of the GUI to the display unit 210, and executes various processing to an input operation with the input unit 220 by the user to the GUI.

The communication unit 250 executes communication processing with an external part. Communication processing executed by the communication unit 250 is not limited to a predetermined standard or protocol. In the present embodiment, the communication unit 250 is configured to execute transmission and reception of various information to/from the server device 300 via the network 10.

As shown in FIG. 2, the server device 300 according to the embodiment of the present disclosure includes a storage unit 310, a communication unit 320, and a control unit 330.

The storage unit 310 can include various storage media, such as a ROM and a RAM. The storage unit 310 stores a program or various information for operations of the server device 300. In the present embodiment, the storage unit 310 can store various information acquired by the wearable device 100. The information acquired in the wearable device 100 can include an image captured by the wearable device 100, sound collected by the wearable device 100, information based on sensing data acquired by the wearable device 100, and the like.

The communication unit 320 executes communication processing with an external part. Communication processing executed by the communication unit 320 is not limited to a predetermined standard or protocol. In the present embodiment, the communication unit 320 is configured to execute transmission and reception of various information to/from the wearable device 100 or the mobile terminal 200 via the network 10.

The control unit 330 includes, for example, a CPU, a ROM, and a RAM, and controls operations of the server device 300. The control unit 330 may read and sequentially execute computer programs stored in the storage unit 310, thereby controlling operations of the server device 300.

The description is given above of the specific functional configuration example of the devices forming the information processing system 1 according to the embodiment of the present disclosure by use of FIG. 2. Subsequently, a description will be given of a functional configuration example of the control unit 140 included in the wearable device 100 shown in FIG. 2.

Figure 3:
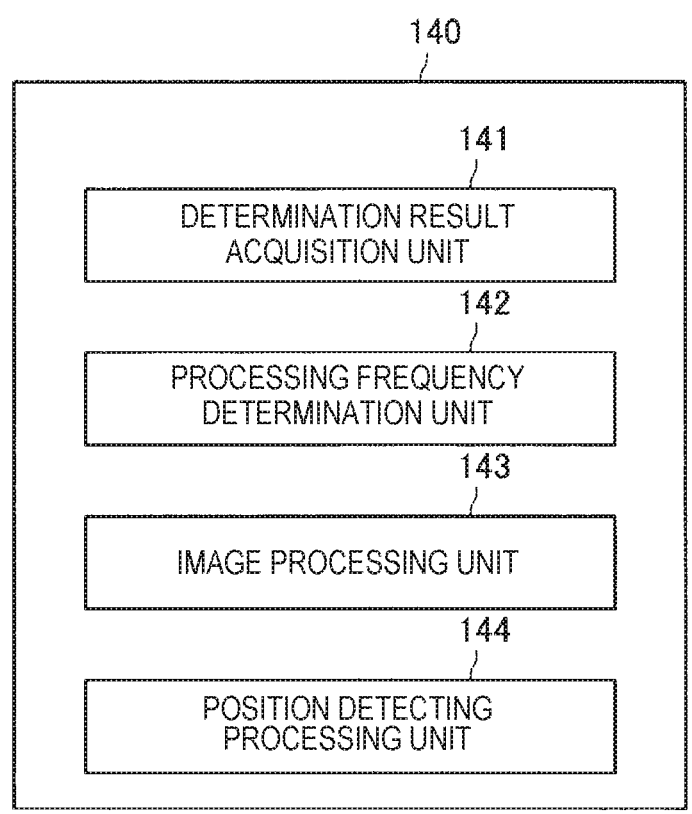
FIG. 3 is an explanatory diagram showing a functional configuration example of a control unit 140 included in a wearable device 100 according to an embodiment of the present disclosure.

FIG. 3 is an explanatory diagram showing a functional configuration example of the control unit 140 included in the wearable device 100 according to the embodiment of the present disclosure. Hereinbelow, a description will be given of the functional configuration example of the control unit 140 by use of FIG. 3.

As shown in FIG. 3, the control unit 140 includes a determination result acquisition unit 141, a processing frequency determination unit 142, an image processing unit 143, and a position detection processing unit 144.

The determination result acquisition unit 141 determines whether or not an index (safety level) indicating whether or not the user 20 carrying the wearable device 100 is in a safe state exceeds a predetermined threshold, and acquires a determination result thereof.

The processing frequency determination unit 142 determines a processing frequency for recording information acquired by the wearable device 100 on the basis of a result of determining whether or not the index (safety level) indicating whether or not the user 20 carrying the wearable device 100 and acquired by the determination result acquisition unit 141, exceeds the predetermined threshold. In the present embodiment, the processing frequency determination unit 142 causes the imaging device to capture an image as a processing frequency for recording the information acquired by the wearable device 100, and determines an imaging frequency for recording the imaging result. Further, in the present embodiment, the control unit 140 transmits the information including the image acquired as a result of the imaging processing of the imaging device as the processing frequency for recording the information to the mobile terminal 200 via the server device 300, and determines the notification frequency for recording to the mobile terminal 200.

The determination result acquisition unit 141 acquires the safety level of the user 20 carrying the wearable device 100 on the basis of the information of the current position of the wearable device 100, for example, detected by the position detection processing unit 144, which will be described later. In a case where the safety level is acquired on the basis of information of the current position of the wearable device 100, the information may be compared with map information stored in the storage unit 120. For example, in a case where the user 20 carrying the wearable device 100 is an elementary school pupil and it is determined that the pupil is at an elementary school where the pupil attends, as a result of detection of the current position of the wearable device 100, the determination result acquisition unit 141 determines that the safety level of the user 20 is extremely high.

Then, the processing frequency determination unit 142 can reduce the processing frequency for recording the information acquired by the wearable device 100 on the basis of the determination result acquired by the determination result acquisition unit 141 or turn off the processing function itself.

The image processing unit 143 executes image processing of the image captured by the imaging unit 110. The image processing of the image captured by the imaging unit 110 can include trimming processing of an image, recognition processing for recognizing a face or an object in the image, and conversion processing for converting the size or resolution of the image, for example. The image processing unit 143 can determine whether or not the recognized face is a person who has been already registered in a case where the recognition processing for recognizing the face in the image is performed. Further, the image processing unit 143 can determine what the recognized object is in a case where the recognition processing for recognizing the object in the image is performed. The processing frequency determination unit 142 may determine the processing frequency on the basis of a result of the image processing with the image processing unit 143. A description will be given later of determination processing of the processing frequency based on a result of the image processing with the processing frequency determination unit 142.

The position detection processing unit 144 detects the current position of the wearable device 100. The position detection processing unit 144 uses sensing data acquired by the sensor unit 130 in a case of detecting the current position of the wearable device 100. Information of the current position of the wearable device 100 detected by the position detection processing unit 144 can be used for determining the processing frequency with the processing frequency determination unit 142.

The description is given above of the functional configuration example of the control unit 140 by use of FIG. 3. Subsequently, a description will be given of an operational example of the wearable device 100 according to the embodiment of the present disclosure.

1.3. Operational Example

Figure 4:
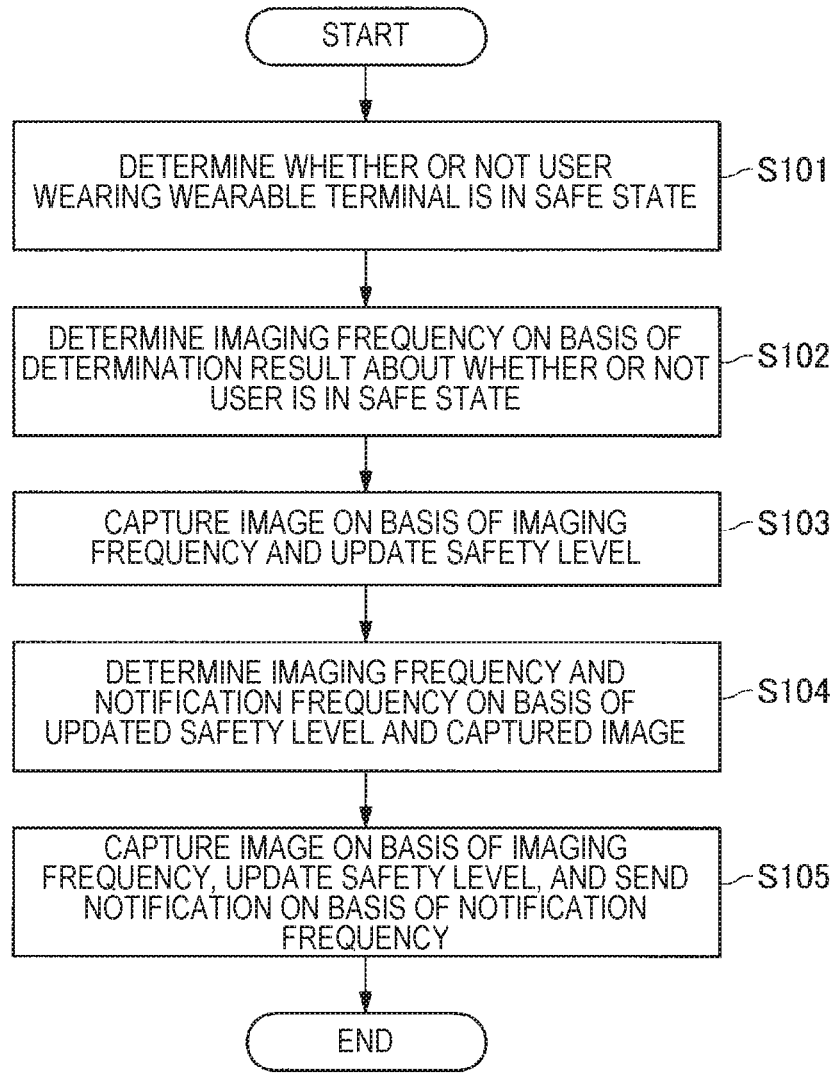
FIG. 4 is a flowchart showing an operational example of the wearable device 100 according to an embodiment of the present disclosure.

FIG. 4 is a flowchart showing an operational example of the wearable device 100 according to the embodiment of the present disclosure. FIG. 4 shows a flowchart showing the operational example of the wearable device 100 in a case of determining the safety level of the user 20 carrying the wearable device 100 and determining the processing frequency for recording the information acquired by the wearable device 100. Hereinbelow, a description will be given of the operational example of the wearable device 100 according to the embodiment of the present disclosure by use of FIG. 4.

The wearable device 100 determines whether or not the user 20 carrying the wearable device 100 is in a safe state in a case of determining the processing frequency for recording the information acquired by the wearable device 100 (step S101). For example, the determination result acquisition unit 141 executes the determination processing in step S101.

A description will be given of a case where the user 20 carrying the wearable device 100 is an elementary school pupil as an example of the determination processing in step S101.

In a case where the user 20 is an elementary school pupil, the wearable device 100 determines that the safety level of the user 20 is high when the user 20 is at school. The wearable device 100 may use the information of the current position acquired by the sensor unit 130 and information of the current time to determine whether or not the user 20 is at school. Further, in a case where it is known in advance, for example, that a camera (security camera) for ensuring the security is installed at a school, the wearable device 100 may determine that the safety level of the user 20 is higher.

Further, in a case where the user 20 is an elementary school pupil, the wearable device 100 determines that the safety level of the user 20 is low when the user 20 is remote from the school after a class.

Furthermore, in a case where the place of a public security camera is known in advance, the wearable device 100 may determine that the safety level of the user 20 is slightly higher near the place of the public security camera.

Moreover, in a case where it is recognized that the user 20 wearing the wearable device 100 behaves differently from usual, from the sensing data output from the sensor unit 130, the wearable device 100 determines that the safety level of the user 20 is low. For example, in a case where although the user 20 turns a specific intersecting point at 17:30 every Wednesday, it is recognized, from the sensing data output by the sensor unit 130, that the user 20 has not reached the intersecting point even at 17:50, the wearable device 100 determines that the safety level of the user 20 is low.

Obviously, the aforementioned determination of the safety level of the user 20 is only an example, and the wearable device 100 can determine the safety level from information about the current position acquired by the sensor unit 130 and information about the current time.

In step S101, it is determined whether or not the user 20 carrying the wearable device 100 is in the safe state. Subsequently, the wearable device 100 determines the imaging frequency of the image with the imaging unit 110 on the basis of a determination result (step S102). Determination processing of the imaging frequency in step S102 is executed by the processing frequency determination unit 142, for example.

For example, in a case where it is determined that the user 20 is at school and the safety level of the user 20 is high, the wearable device 100 may determine the imaging frequency of the image with the imaging unit 110 at an extremely long interval, such as once per three hours, or may not capture an image with the imaging unit 110. Further, for example, in a case where it is determined that the user 20 is remote from the school and the safety level of the user 20 lowers, the wearable device 100 may increase the imaging frequency of the image with the imaging unit 110 to determine the imaging frequency at a short interval, such as once per ten minutes.

Further, for example, in a case where it is determined that the user 20 is near the place of a public security camera though the user 20 is remote from the school and the safety level of the user 20 is slightly high, the wearable device 100 reduces the imaging frequency of the image with the imaging unit 110 as compared with a case where there is not the public security camera nearby, thereby determining the imaging frequency at an interval such as once per twenty minutes. In this way, the wearable device 100, in a case where the user 20 is near the place of the public security camera, can suppress the consumption of the battery of the wearable device 100 by reducing the imaging frequency of the image with the imaging unit 110.

Further, for example, in a case where even when the user 20 wearing the wearable device 100 is remote from the school, the user, for example, stays at a narrow park, and the place of the user 20 does not largely change for a predetermined time, the wearable device 100 may determine the imaging frequency of the image with the imaging unit 110 at a time longer than once per ten minutes, for example, an interval, such as once per twenty minutes.

In above step S102, the imaging frequency of the image with the imaging unit 110 is determined. The wearable device 100 subsequently causes the imaging unit 110 to capture an image on the basis of the imaging frequency determined in above step S102, and updates the safety level of the user 20 on the basis of the image captured by the imaging unit 110 (step S103).

The wearable device 100 analyzes the image captured by the imaging unit 110 with the image processing unit 143, thereby grasping the current state of the periphery of the user 20. For example, in a case where a person is reflected on the image captured by the imaging unit 110, the image processing unit 143 analyzes the image, and thereby the wearable device 100 can grasp whether or not there is a person around the user 20 and, if there is a person, can grasp who is the person staying with the user 20. In a case where, the wearable device 100 can grasp. Then, in a case where it is recognized that the person staying with the user 20 is not registered in advance, the wearable device 100 can determine to increase the imaging frequency of the image (for example, reduce an imaging interval).

In above step S103, the imaging unit 110 is caused to capture an image on the basis of the determined imaging frequency and the safety level of the user 20 is updated on the basis of the captured image. Subsequently, the wearable device 100 determines the imaging frequency and the notification frequency on the basis of the updated safety level and the captured image (step S104). Determination processing of the notification frequency in step S104 is executed by the processing frequency determination unit 142, for example.

Then, the imaging frequency and the notification frequency are determined in above step S104, and subsequently the wearable device 100 captures an image on the basis of the determined imaging frequency, updates the safety level on the basis of the captured image, and also notifies the safety level on the basis of the notification frequency determined in step S104 (step S105). After the notification on the basis of the determined notification frequency, the wearable device 100 may return to determination processing of the safety level in step S101.

For example, as a result of analysis of the captured image in step S103, in a case where a person staying with the user 20 is not registered in advance, does not simply pass over and is always reflected on the captured image, the wearable device 100 transmits its information to the server device 300 in order to notify the mobile terminal 200 that an unknown person is near the user 20.

For example, as a result of analysis of the captured image in step S103, in a case where a person staying with the user 20 is recognized to be a friend who is registered in advance, the wearable device 100 may transmit its information to the server device 300 in order to notify the mobile terminal 200 that the friend of the user 20 is near the user 20. Further, as a result of analysis of the captured image in step S103, in a case where the friend who is registered in advance disappears from the captured image, the wearable device 100 may transmit its information to the server device 300 in order to notify the mobile terminal 200 that the friend of the user 20 has disappeared from near the user 20.

In addition, in a case where the wearable device 100 performs face recognition processing on the captured image and the same person is reflected for a predetermined time (predetermined number of times) or more, the wearable device 100 may transmit its information to the server device 300 in order to notify the mobile terminal 200 that the same person is near the user 20. For example, in a case where the wearable device 100 performs the face recognition processing on the captured image and it is recognized that an adult is close to the periphery of the user 20, the wearable device 100 may transmit its information to the server device 300 in order to notify the mobile terminal 200 that the adult is near the user 20.

Here, the wearable device 100 updates the safety level on the basis of the captured image and determines the imaging frequency and the notification frequency, and additionally may determine the imaging frequency and the notification frequency by updating the safety level on the basis of the information of the sensing data.

For example, in a case where it is recognized from the information of the sensing data that the current position of the wearable device 100 is on a road having a large traffic volume of vehicles or a blind road, which is registered in advance, the wearable device 100 may increase the imaging frequency or the notification frequency. Note that, the wearable device 100 may determine, from the captured image, whether the current position is on a road having a large traffic volume of vehicles or a blind road. That is, the wearable device 100 may determine the imaging frequency and the notification frequency on the basis of contents of a landscape included in the captured image. Further, in a case where it is recognized that the current position of the wearable device 100 is on a dark road from positional information or an illuminance sensor, the wearable device 100 may increase the imaging frequency or the notification frequency. Furthermore, the wearable device 100 may change the imaging frequency and the notification frequency depending on the time or the current weather.

Further, in a case where sensing data in which it is assumed that a suspicious person approaches from behind or the user 20 has dropped the wearable device 100 is acquired from the sensor unit 130, the wearable device 100 may increase the imaging frequency or the notification frequency.

For example, in a case where an acceleration sensor is included in the sensor unit 130 and the sensing data in which it is assumed that the user 20 looks back, is violent, or suddenly starts to run is acquired from the sensor unit 130, the wearable device 100 may increase the imaging frequency or the notification frequency.

Further, for example, in a case of acquiring from the sensor unit 130 the sensing data acquired in a case of detecting a strong shock or fall such as a bump to a vehicle or fall from a high place, the wearable device 100 may increase the imaging frequency or the notification frequency.

Furthermore, in a case where it is recognized that the user 20 has behaved differently from schedule or from daily behavior of the user 20, the wearable device 100 may increase the imaging frequency or the notification frequency. For example, in a case where it is recognized that the user 20 has not passed a predetermined position at an original passage time, the wearable device 100 may increase the imaging frequency or the notification frequency.

Note that, even in a case where the user 20 does not pass through the predetermined position at the original passage time, it may be delayed only because the user 20 walks while talking with a friend, for example. Therefore, in a case where the user 20 does not pass through the predetermined position at the original passage time and does not pass through the predetermined position even after passage of a predetermined time from the time, the wearable device 100 may increase only the imaging frequency. In a case where the user 20 does not pass through the predetermined position even after further passage of a predetermined time from the increase of the imaging frequency, the wearable device 100 may further increase the imaging frequency and may increase the notification frequency. The predetermined time may be changed by a user of the mobile terminal 200 that receives the notification.

Further, in a case of recognizing that the user 20 gets on a vehicle or gets off the vehicle by the sensing data from the sensor unit 130, the wearable device 100 may determine the processing frequency at get-on/off timing of the vehicle. For example, the wearable device 100 may determine the processing frequency at timing, for example, at which the user 20 gets on a train, or gets on a bicycle.

Furthermore, in a case of recognizing that the wearable device 100 is detached from the user 20 with the sensing data from the sensor unit 130, the wearable device 100 may increase the processing frequency at the timing.

Further, the wearable device 100 may determine to reduce the notification frequency in a case where a large number of the same subjects are reflected on the image captured by the imaging unit 110.

Furthermore, in a case where the remaining amount of a battery of the wearable device 100 is checked and is reduced to a predetermined amount or less, the wearable device 100 may determine to reduce the processing frequency. Moreover, in a case where the sensor unit 130 includes a dedicated battery, the wearable device 100 may check the remaining amount of the battery of the sensor unit 130, and if the remaining amount is reduced to a predetermined amount or less, may determine to reduce the processing frequency.

Further, the wearable device 100 may change the processing frequency in accordance with the distance to the mobile terminal 200. The wearable device 100 may presume the distance to the mobile terminal 200, for example, on the basis of a predetermined strength of electric waves generated from the mobile terminal 200. For example, the wearable device 100 reduces the processing frequency in a case where the mobile terminal 200 exists close. However, in a case where the mobile terminal 200 is slightly remote from the situation where it existed close, it may be considered that the user 20 was lost, and the wearable device 100 increases the processing frequency in such a case.

A user of the mobile terminal 200 that received a notification from the wearable device 100 (received a notification from the server device 300) checks notification contents from the wearable device 100, and may change the processing frequency of the wearable device 100 in accordance with a check result thereof.

For example, in a case where the wearable device 100 notifies together with an image of a person that the person who is not registered is near the user 20, the user of the mobile terminal 200 replies, to the wearable device 100, that the user is familiar with the person and there is no problem, and then the wearable device 100 reduces the processing frequency.

Further, for example, even in a case where action of the user 20 is different from a planned schedule, the user of the mobile terminal 200 replies, to the wearable device 100, that the user of the mobile terminal 200 grasps the difference, and then the wearable device 100 reduces the processing frequency.

Note that, the processing frequency of the wearable device 100 may be designated from the mobile terminal 200.

The above description is given of the case where all of processing for determining the processing frequency of the wearable device 100 is performed by the wearable device 100. However, a part or all of processing for determining the processing frequency of the wearable device 100 may be shifted to the server device 300. That is, storage of an image, analysis and identification of a person or a situation, or the like, may be performed by the server device 300.

In a case where a part or all of the processing for determining the processing frequency of the wearable device 100 is shifted to the server device 300, the processing frequency of the wearable device 100 may be determined with combination of information of a wearable device 100 carried by another user. For example, in a case where even a person that is not registered to a processing frequency of a wearable device 100 of a certain user 20 is registered to the wearable device 100 of another user, information registered to the wearable device 100 of the another user may be used for the server device 300.

Moreover, in a case where the server device 300 determines the processing frequency, the processing frequency of the wearable device 100 may be determined with combination of the information of the wearable device 100 carried by another user near the certain user 20. For example, the server device 300 may compare an image captured by the wearable device 100 of a certain user 20 with an image captured by the wearable device 100 carried by the another user 20 close to the user 20, thereby determining the processing frequency of the wearable device 100 of the certain user 20.

Further, the wearable device 100 may determine the processing frequency of the wearable device 100 in cooperation with another device.

Furthermore, in a case where the imaging unit 110 can be separated and it is known that an image captured by the imaging unit 110 is different from information of the current position acquired by the sensor unit 130, the wearable device 100 may determine to increase the processing frequency. In a case where it is known that the image captured by the imaging unit 110 is different from the information of the current position acquired by the sensor unit 130, the wearable device 100 increases the processing frequency, and can thus notify a user of the mobile terminal 200 that either the imaging unit 110 or the sensor unit 130 has been dropped.

The wearable device 100 may capture a moving image with the imaging unit 110. Then, the wearable device 100 may notify the mobile terminal 200 of not a still image but a moving image with streaming transmitting. However, continuously capturing the moving image and streaming transmitting the moving image to the mobile terminal 200 increases the amount of consumption of a battery of the wearable device 100 and also generates heat along with increase of a processing load of the wearable device 100.

Accordingly, the wearable device 100 stores the moving image captured by the imaging unit 110 to the storage unit 120 and simultaneously transmits the still image to the mobile terminal 200, thereby transmitting a notification to the mobile terminal 200. Then, in a case of designation by the user of the mobile terminal 200, the mobile terminal 200 may access the wearable device 100 and reproduce the moving image stored in the wearable device 100. In a case of reproducing the moving image stored in the wearable device 100 with the mobile terminal 200, in order for the user of the mobile terminal 200 to efficiently reproduce the image, the wearable device 100 may divide and store a file of the moving image. The wearable device 100 divides and stores the file of the moving image, thereby reducing a file size of the moving image and reducing a time for transfer or the like.

Figure 5:
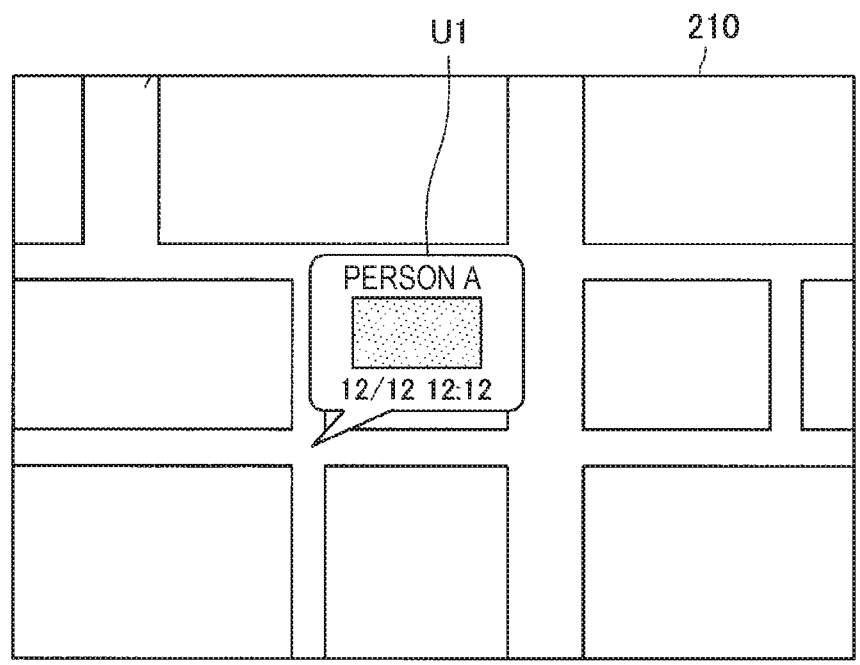
FIG. 5 is an explanatory diagram showing an example of a user interface displayed on a display unit 210 of a mobile terminal 200.

An example is shown of a user interface (UI) displayed by the mobile terminal 200. FIG. 5 is an explanatory diagram showing an example of a user interface displayed on the display unit 210 of the mobile terminal 200. FIG. 5 shows an example of the user interface for superimposing an image captured by the wearable device 100 to an image of an imaging place on a map.

The user interface shown in FIG. 5 shows also who is reflected on the captured image together. Information indicated with reference symbol U1 in FIG. 5 includes an image captured by the imaging unit 110 of the wearable device 100, a person reflected on the image, and date and time for capturing the image. The information indicated with the reference symbol U1 is displayed so as to correspond to the place where the imaging processing with the imaging unit 110 was performed.

As described above, the user interface displayed by the mobile terminal 200 not only displays an image as it is but also can present where the image has been captured by displaying the image on the map. Further, the user interface may make it possible to grasp together a reason of being notified to the mobile terminal 200.

Figure 6:
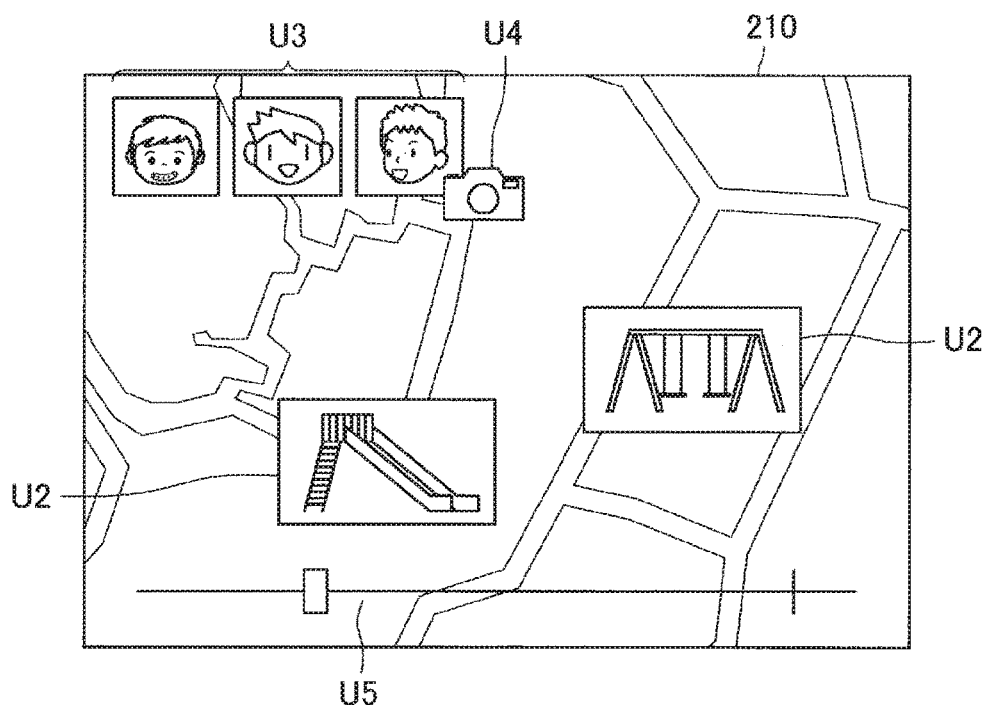
FIG. 6 is an explanatory diagram showing another example of the user interface displayed on the display unit 210 of the mobile terminal 200.

FIGS. 6 and 7 are explanatory diagrams showing other examples of a user interface displayed on the display unit 210 of the mobile terminal 200.

An image indicated with reference symbol U2 of a user interface shown in FIG. 6 is captured by the imaging unit 110 of the wearable device 100. The image indicated with the reference symbol U2 is displayed so as to correspond to a place where the imaging processing with the imaging unit 110 is performed. An icon indicated with reference symbol U3 of the user interface shown in FIG. 6 indicates with whom the user 20 wearing the wearable device 100 stays. An icon indicated with reference symbol U4 of a user interface shown in FIG. 6 is for displaying an image acquired by the wearable device 100 carried by a user staying together with the user 20 wearing the wearable device 100. A scroll bar indicated with reference symbol U5 of a user interface shown in FIG. 6 is for changing time, and when a slide operation is performed by the user of the mobile terminal 200, information displayed on the display unit 210 changes.

FIG. 7 is an explanatory diagram showing an example in which information displayed on the display unit 210 changes with an operation of a scroll bar shown by the reference symbol U5 in FIG. 6. The scroll bar is operated to the left, that is, earlier in time, such a state is displayed that the user 20 just left his/her apartment building and is alone and there is not another user together. However, when the scroll bar is operated to the right, that is, later in time, such a state is shown that the user 20 moves to a park, for example, and stays together with a friend.

The user interface displayed on the mobile terminal 200 is not limited to the examples. For example, it may be displayed such that when and where the user met whom is displayed as in an address notebook with the face as the center.

Obviously, the mobile terminal 200 may notify the user of not only such a user interface but also information from the wearable device 100 with sound.

An image other than the image transmitted from the wearable device 100 is recorded in the wearable device 100. Therefore, the user of the mobile terminal 200 accesses the wearable device 100 from the mobile terminal 200 in a case where the user is interested in which image is additionally captured, and thereby can view, on the mobile terminal 200, the image stored in the wearable device 100 and not transmitted to the mobile terminal 200.

In a case where a predetermined number of images are captured, the wearable device 100 may bundle and transmit a plurality of images to the mobile terminal 200. For example, after capturing 25 images, the wearable device 100 may transmit the images to the mobile terminal 200 as one image obtained by arranging 5 images in the vertical direction and 5 images in the horizontal direction in a grid pattern. In a case of bundling a plurality of images, the wearable device 100 may exclude or include an image already-transmitted to the mobile terminal 200.

As an example of a use case, when the user 20 starts to use the wearable device 100, for example, the wearable device 100 first enters a mode for causing the imaging unit 110 to capture an image at a predetermined interval. In a case where the user 20 uses the wearable device 100 in the mode for a few days, the wearable device 100 recognizes which action the user 20 usually takes, for example, from an acquired image or positional information. Further, the mobile terminal 200 also can present which action the user 20 takes on the user interface.

Therefore, the user of the mobile terminal 200 operates the presented user interface, and can designate a place or time for changing the processing frequency of the wearable device 100. The information used in designating the place or the time for changing the processing frequency of the wearable device 100 may be additionally public information (presented by a public organization) or social information (informed by an unspecific user or automatically determined with an image).

With the change in processing frequency of the wearable device 100, the user of the mobile terminal 200 can grasp a state of the user 20 wearing the wearable device 100 even at a place remote from the user 20.

The wearable device 100 may change an amount of information notified to the mobile terminal 200 other than the processing frequency. For example, the wearable device 100 may change resolution of a captured image, may also use not only the captured image but also sound collected by a microphone as the information notified to the mobile terminal 200, and may also use biological information as information notified to the mobile terminal 200 in a case of acquiring the biological information with the sensor unit 130.

In a case where a plurality of users have the wearable devices 100, and the plurality of users are at near places, there may be a case where it is unnecessary for all the wearable devices 100 to capture and transmit images to the server device 300. Therefore, when it is recognized that a plurality of users have the wearable devices 100 and the plurality of users are at near places, only one wearable device 100 may capture and transmit an image to the server device 300. Only one wearable device 100 captures and transmits an image to the server device 300, and thereby it is possible to save the battery of each wearable device 100. In this case, only the wearable device 100 having the largest remaining amount of the battery may capture and transmit an image to the server device 300.

A place where images are captured by a plurality of wearable devices 100 may be automatically recognized by the server device 300 as a place with low safety level, and the existence of such a place may be notified to the wearable device 100 or the mobile terminal 200. The wearable device 100, by receiving information about the place where images are captured by the plurality of wearable devices 100 from the server device 300, can determine to increase the processing frequency when the user 20 is close to the place.

The wearable device 100 may select the server device 300 as a notification destination of the information including the image captured by the imaging unit 110. For example, in a case where the server device 300 is configured to perform analyzing processing or the like of the image that the wearable device 100 caused the imaging unit 110 to capture, the wearable device 100 transmits the image captured by the imaging unit 110 to the server device 300 and causes the server device 300 to analyze the image. Then, the wearable device 100 may acquire an analysis result of the server device 300 and determine the processing frequency from the analysis result.

Further, the wearable device 100 and the mobile terminal 200 may cause the imaging device to capture an image on the basis of speech contents of the user. For example, when the microphone 150 collects sound of speech 'what is this?' by the user 20 of the wearable device 100, the wearable device 100 may cause the imaging unit 110 to capture an image on the basis of the speech contents. Further, when the microphone of the mobile terminal 200 collects sound 'what is this?' uttered by the user of the mobile terminal 200 having received the notification from the wearable deice 100, the mobile terminal 200 may instruct the wearable device 100 to capture an image.

Note that, the server device 300 may automatically analyze the image, but the user operating the server device 300 may view the captured image, determine who is reflected, and return the determination result to the wearable device 100.

Further, the wearable device 100 may include an input device such as a dedicated button for causing the imaging unit 110 to capture an image. When the user of the wearable device 100 operates the input device, the wearable device 100 may cause the imaging unit 110 to capture an image and transmit the captured image to a notification destination. If the server device 300 is set as the notification destination of the wearable device 100, the server device 300 may analyze the image as described above and return the analysis result to the wearable device 100.

2. Hardware Configuration Example

Figure 8:
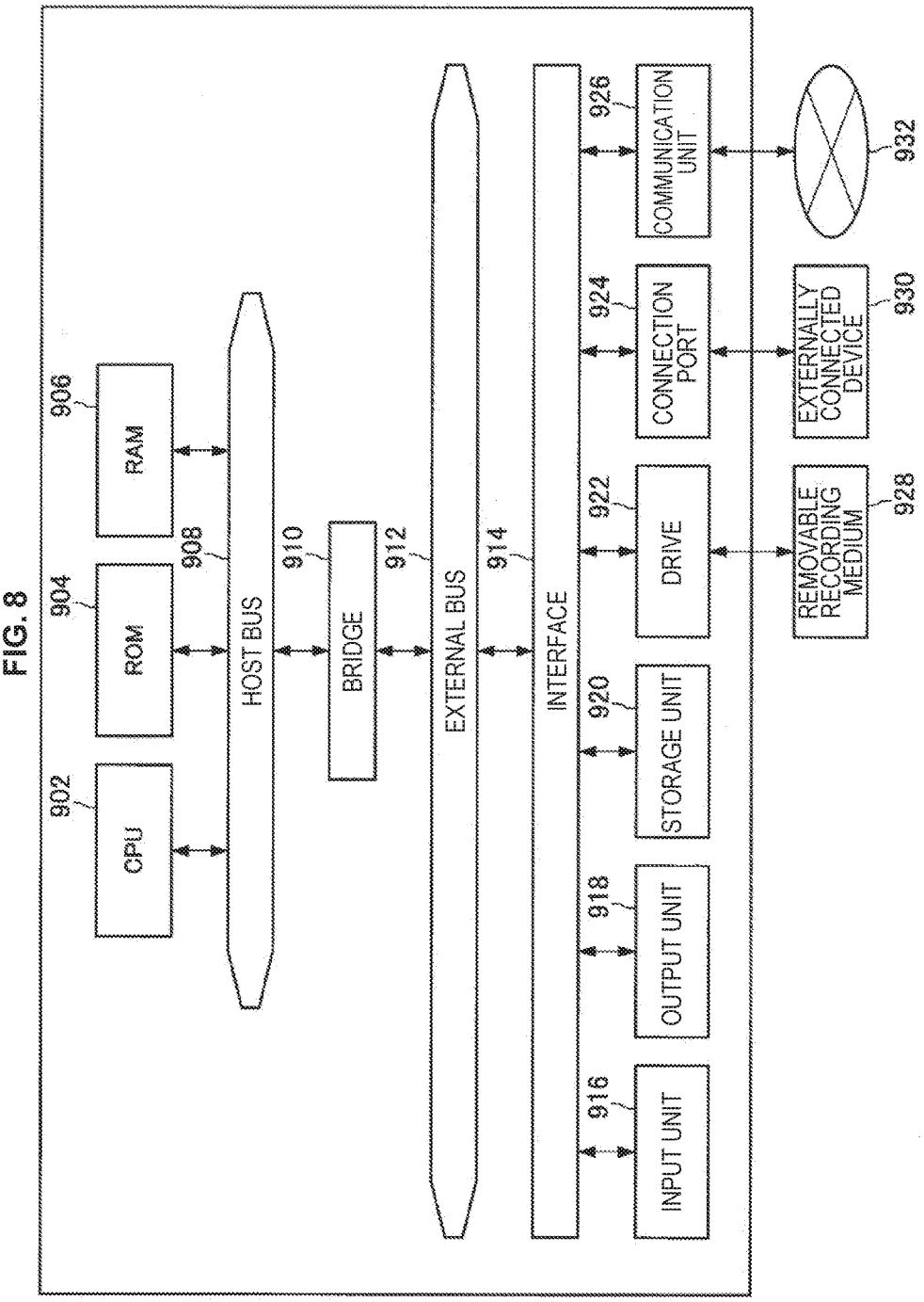
FIG. 8 is an explanatory diagram showing a hardware configuration example.

Next, a hardware configuration of the wearable device 100 and the mobile terminal 200 according to an embodiment of the present disclosure will be described with reference to FIG. 8. FIG. 8 is a block diagram illustrating a hardware configuration example of the wearable device 100 and the mobile terminal 200 according to the embodiment of the present disclosure. Each of the algorithms described above can be performed by using, for example, the hardware configuration of the information processing device shown in FIG. 8. That is, the processing of each of the algorithms can be realized by controlling the hardware shown in FIG. 8 using a computer program.

Note that the mode of this hardware shown in FIG. 8 is arbitrary, and may be, for example, a personal computer, a mobile information terminal such as a mobile phone, a PHS or a PDA, a game machine, a contact or non-contact IC chip, a contact or non-contact IC card, a loud speaker, a television set, a monitor, a wearable device, or various types of information appliances. Moreover, the PHS is an abbreviation for Personal Handy-phone System. Also, the PDA is an abbreviation for Personal Digital Assistant.

As shown in FIG. 8, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element on the basis of various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

The example of the hardware configuration of the wearable device 100 and the mobile terminal 200 has been described. Each of the structural elements described above may be configured by using a general purpose component or may be configured by hardware specialized for the function of each of the structural elements. The configuration may be changed as necessary in accordance with the state of the art at the time of working of the present disclosure.

3. Conclusion

According to the embodiment of the present disclosure as described above, the wearable device 100 is provided to acquire a determination result about whether or not the user is in the safe state and determine the processing frequency for recording the acquired information on the basis of the acquired determination result.

The wearable device 100 according to the embodiment of the present disclosure first determines the imaging frequency for causing the imaging unit 110 to capture an image from a determination result about whether or not the user is in the safe state. Then, the wearable device 100 according to the embodiment of the present disclosure causes the imaging unit 110 to capture an image at the determined imaging frequency, further determines the imaging frequency from the image acquired by the imaging processing, and also determines the notification frequency for notifying the information to the mobile terminal 200.

The wearable device 100 according to the embodiment of the present disclosure can properly notify the current state of a wearer on the basis of a determination result about whether or not the wearer is safe. Further, the wearable device 100 according to the embodiment of the present disclosure can suppress battery consumption to a necessary minimum by properly notifying the current state of a wearer on the basis of a determination result about whether or not the wearer is safe. The wearable device 100 according to the embodiment of the present disclosure can largely reduce the possibility that the imaging and notification cannot be performed due to shortage of the battery in a case where the imaging and the notification are actually required by suppressing the battery consumption to a necessary minimum.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

In addition, some or all of the functional blocks shown in the functional block diagrams used in the above description may be implemented by a server device that is connected via a network, for example, the Internet. In addition, configurations of the functional blocks shown in the functional block diagrams used in the above description may be implemented in a single device or may be implemented in a system in which a plurality of devices cooperate with one another. The system in which a plurality of devices cooperate with one another may include, for example, a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that the effects described above are not necessarily limitative. With or in the place of the above effects, there may be achieved any one of the effects described in this specification or other effects that may be grasped from this specification.

Additionally, the present technology may also be configured as below.

(1)

An information processing device including:

a determination result acquisition unit configured to acquire a determination result of a safety state of a user carrying a sensing unit for sensing a peripheral environment; and a frequency determination unit configured to determine a processing frequency for recording information based on the sensing, on a basis of the determination result acquired by the determination result acquisition unit.

(2)

The information processing device according to (1), wherein the sensing unit includes an imaging unit configured to capture an image, and the frequency determination unit determines an imaging frequency at which the imaging unit captures an image, as the processing frequency.

(3)

The information processing device according to (2), wherein the frequency determination unit determines the imaging frequency on a basis of a position of the sensing unit.

(4)

The information processing device according to (2), wherein the frequency determination unit determines the imaging frequency on a basis of a schedule of the user carrying the sensing unit.

(5) The information processing device according to (2), wherein
the frequency determination unit determines the imaging frequency on a basis of sensing data acquired by the sensing unit.

(6) The information processing device according to (5), wherein
the frequency determination unit determines the imaging frequency on a basis of a content of the image captured by the imaging unit.

(7) The information processing device according to (6), wherein
the frequency determination unit determines the imaging frequency on a basis of a person included in the image captured by the imaging unit.

(8) The information processing device according to (7), wherein
the frequency determination unit reduces the imaging frequency in a case where the person included in the image captured by the imaging unit is a person not registered in advance.

(9) The information processing device according to any of (6), wherein
the frequency determination unit determines the imaging frequency on a basis of a content of a landscape included in the image captured by the imaging unit.

(10) The information processing device according to any of (2) to (9), wherein
the frequency determination unit determines the imaging frequency on a basis of a remaining amount of a battery.

(11) The information processing device according to any of (1) to (10), wherein
the sensing unit includes an imaging unit that captures an image, and
the frequency determination unit determines a communication frequency at which the information processing device communicates image information based on the imaging performed by the imaging unit with another device, as the processing frequency.

(12) The information processing device according to (11), wherein
the frequency determination unit determines the communication frequency on a basis of sensing data acquired by the sensing unit.

(13) The information processing device according to (12), wherein
the frequency determination unit determines the communication frequency on a basis of a content of the image captured by the imaging unit.

(14) The information processing device according to any of (1) to (13), wherein
the frequency determination unit makes a determination such that the processing frequency becomes lower as the determination result acquired by the determination result acquisition unit shows a safer state.

(15) The information processing device according to any of (1) to (14), wherein
a sensing target of the sensing unit is positional information.

(16) The information processing device according to (15), wherein
the determination result acquisition unit acquires a safety state determined on a basis of the positional information sensed by the sensing unit.

(17) The information processing device according to (16), wherein
the frequency determination unit determines the processing frequency in accordance with information sensed by another sensing unit existing around the user.

(18) The information processing device according to any of (1) to (17), wherein
a sensing target of the sensing unit is biological information of the user.

(19) An information processing method including:
acquiring a determination result about whether or not a user is in a safe state; and
determining a processing frequency for recording acquired information on a basis of the acquired determination result.

(20) A computer program for causing a computer to execute:
acquiring a determination result about whether or not a user is in a safe state; and
determining a processing frequency for recording acquired information on a basis of the acquired determination result.

REFERENCE SIGNS LIST 1 information processing system
10 network
20 user
100 wearable device
110 imaging unit
120 storage unit
130 sensor unit
140 control unit
141 determination result acquisition unit
142 processing frequency determination unit
143 image processing unit
144 position detection processing unit
150 microphone
160 communication unit
200 mobile terminal
210 display unit
220 input unit
230 storage unit
240 control unit
250 communication unit
300 server device
310 storage unit
320 communication unit
330 control unit

The invention claimed is:

1. An information processing device, comprising:
   a sensing unit configured to sense a peripheral environment in a specific proximity of a user;
   a determination result acquisition unit configured to:
      acquire, from the sensing unit, a determination result that indicates an index associated with a user safety state; and
      determine a value of the index associated with the user safety state based on the acquired determination result; and
   a frequency determination unit configured to determine a processing frequency based on the value of the index associated with the user safety state.

2. The information processing device according to claim 1,
   wherein the sensing unit includes an imaging unit configured to capture an image, and
   wherein the frequency determination unit is further configured to determine an imaging frequency associated with the capture of the image as the processing frequency.

3. The information processing device according to claim 2,
   wherein the frequency determination unit is further configured to determine the imaging frequency based on a position of the sensing unit.

4. The information processing device according to claim 2,
   wherein the frequency determination unit is further configured to determine the imaging frequency based on a user schedule.

5. The information processing device according to claim 2,
   wherein the frequency determination unit is further configured to determine the imaging frequency based on the sensed peripheral environment.

6. The information processing device according to claim 5,
   wherein the frequency determination unit is further configured to determine the imaging frequency based on a content of the captured image.

7. The information processing device according to claim 6,
   wherein the frequency determination unit is further configured to determine the imaging frequency based on a presence of a person in the captured image.

8. The information processing device according to claim 7,
   wherein the frequency determination unit is further configured to reduce the imaging frequency based on the person in the captured image is an unregistered person.

9. The information processing device according to claim 6,
   wherein the frequency determination unit is further configured to determine the imaging frequency based on a content of a landscape in the captured image.

10. The information processing device according to claim 2,
    wherein the frequency determination unit is further configured to determine the imaging frequency based on a remaining amount of a battery associated with the information processing device.

11. The information processing device according to claim 1, further comprising a communication unit,
    wherein the sensing unit includes an imaging unit configured to capture an image based on a presence of an external device in a specific proximity of the information processing device,
    wherein the frequency determination unit is further configured to determine, as the processing frequency, a communication frequency, and
    wherein the communication unit is configured to communicate image information with an external device based on the captured image.

12. The information processing device according to claim 11,
    wherein the frequency determination unit is further configured to determine the communication frequency based on the sensed peripheral environment.

13. The information processing device according to claim 12,
    wherein the frequency determination unit is further configured to determine the communication frequency based on a content of the captured image.

14. The information processing device according to claim 1,
    wherein the processing frequency is less than a threshold frequency, and
    wherein the acquired determination result indicates a safer state based on the processing frequency that is less than the threshold frequency.

15. The information processing device according to claim 1,
    wherein a sensing target of the sensing unit is positional information.

16. The information processing device according to claim 15,
    wherein the determination result acquisition unit is further configured to acquire the user safety state based on the positional information.

17. The information processing device according to claim 16,
    wherein the frequency determination unit is further configured to determine the processing frequency based on information sensed by an external sensing unit that exists in the specific proximity of the user.

18. The information processing device according to claim 1,
    wherein a sensing target of the sensing unit is user's biological information.

19. An information processing method, comprising:
    in an information processing device that includes a sensing unit:
       sensing, by the sensing unit, a peripheral environment in a specific proximity of a user;
       acquiring, from the sensing unit, a determination result that indicates an index associated with a user safety state;
       determining a value of the index associated with the user safety state based on the acquired determination result; and
       determining a processing frequency based on the value of the index associated with the user safety state.

20. A non-transitory computer-readable medium having stored thereon computer-executable instructions which, when executed by a computer cause the computer to execute operations, the operations comprising:
    sensing a peripheral environment in a specific proximity of a user;
    acquiring a determination result that indicates an index associated with a user safety state;

determining a value of the index associated with the user safety state based on the acquired determination result; and determining a processing frequency based on the value of the index associated with the user safety state.

* * * * *